Nov. 15, 1927.  1,649,169
L. A. LAURSEN
TIRE MOLD
Filed Nov. 14, 1924   2 Sheets-Sheet 2
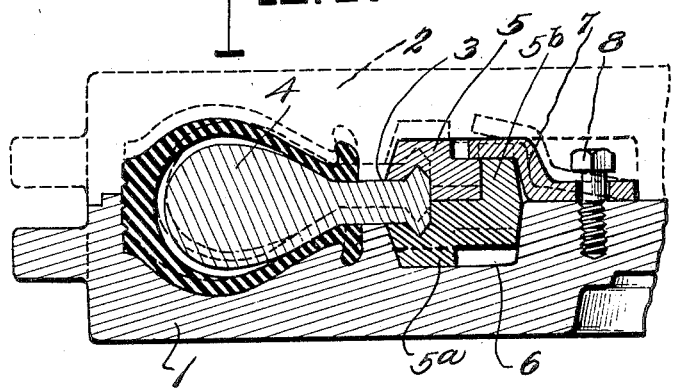
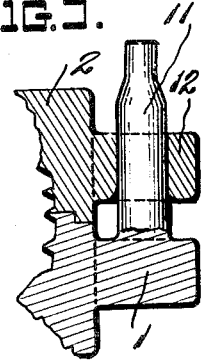
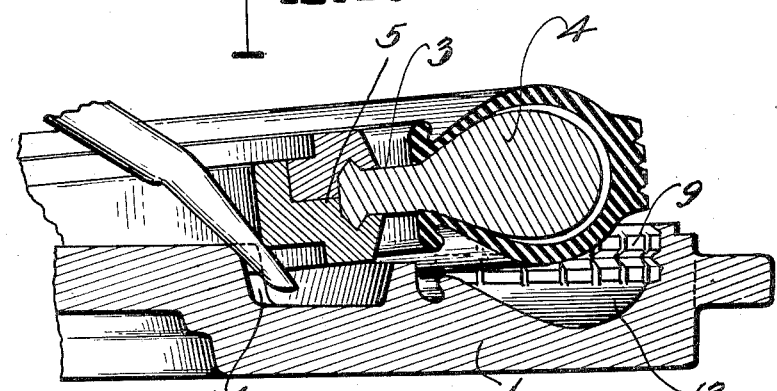
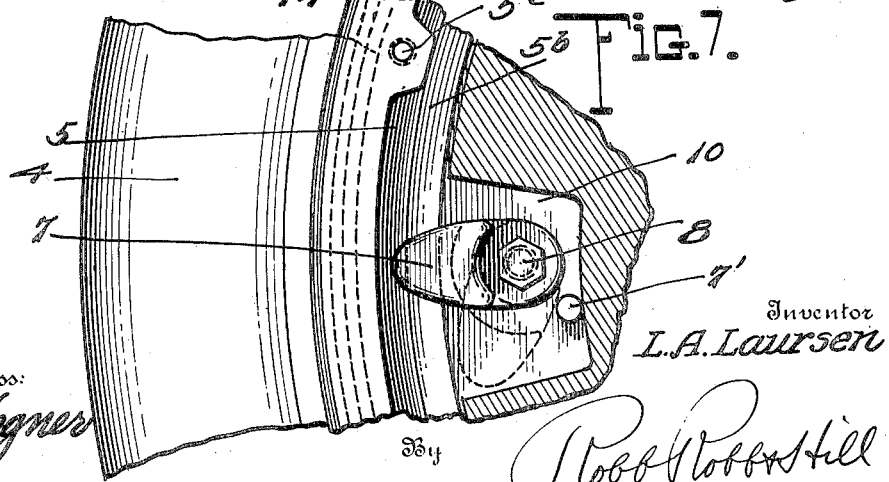
Inventor
L. A. Laursen Patented Nov. 15, 1927.

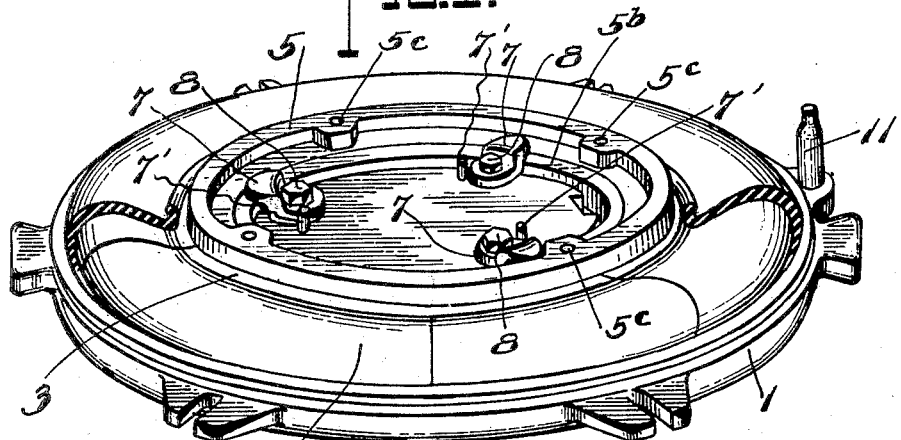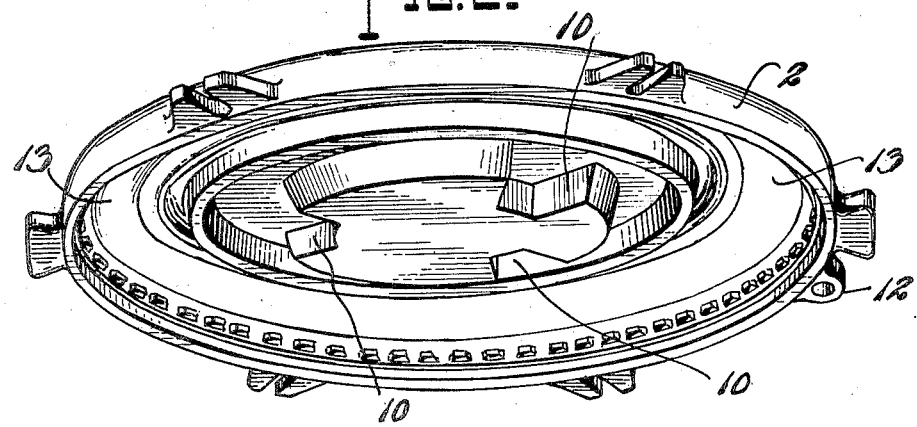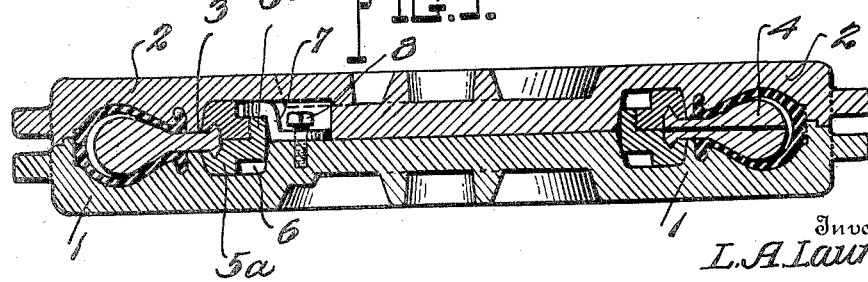

1,649,169

UNITED STATES PATENT OFFICE.

LAURITS A. LAURSEN, OF EAU CLAIRE, WISCONSIN.

TIRE MOLD.

Application filed November 14, 1924. Serial No. 749,911.

The present invention appertains to improvements in that type of tire molding apparatus which is disclosed in my co-pending application Serial Number 706,526, filed April 7, 1924, for a tire mold, and has more particularly to do with the incorporation therein of improvement features which greatly facilitate certain of the operations incident to the use of such apparatus.

It may here be explained that the objects and advantages of tire molding members provided with central pressure surfaces or inner solid portions are fully set forth and claimed in my co-pending application above referred to, and it suffices to say that I take advantage of such construction in the embodiment of these improvements which are primarily directed to the provision of means for retaining the tire in one of the complemental mold members when such members are supported following the molding and vulcanizing operation. In other words, considerable difficulty is experienced in molding tires, especially that type the tread surface of which is formed with protuberances or non-skid projections, when removing the tires from the molds by the adherence of the tire to the top mold member instead of the bottom one.

These mold members are of considerable weight, relatively speaking, and when this takes place it becomes necessary to turn the top member completely over to effect the removal operation of the tire from said upper half. This of course necessitates the further operation of turning the upper mold member back when replacing it for a subsequent molding operation. Not only does this constitute a source of annoyance, but it involves additional costs in labor and time, and the object of my present invention is mainly to eliminate this difficulty by providing on one of the mold members stop means or locking elements adapted to cooperate with the tire molding unit which usually comprises the core and bull or clamping ring.

It is further an object in view to provide a construction of the central solid portion of the mold member opposite the one carrying the aforesaid locking elements which will maintain said elements against accidental displacement and release of the core molding unit.

The construction is further improved by the formation of the central solid portion of one of the mold members such that the application and removal of the tire core unit is facilitated to a great extent.

Other objects and advantages of the invention will be hereinafter set forth and the novel features thereof defined by the appended claims.

In the drawing:

Figure 1 is a perspective view of the lower mold member with the core unit and tire disposed therein, the tire carcass being partly broken away showing the core;

Figure 2 is a perspective view of the upper mold member, viewing the under side of the same;

Figure 3 is a transverse sectional view of the mold as arranged during molding operation;

Figure 4 is an enlarged fragmentary sectional view of the mold showing in dotted lines the position of the core unit in its preliminary positon when disposed in the lower mold member prior to being pressed home by the top mold member or the ram;

Figure 5 is an enlarged fragmentary sectional view of the mold showing in elevation the registering pin provided for facilitating the disposition of the mold members in cooperative relation;

Figure 6 is an enlarged sectional view showing more clearly the method of displacement of the core unit from the lower mold section; and Figure 7 is an enlarged fragmentary sectional view showing in plan one of the locking members engageable with the core unit to hold it in the lower mold section.

In the accompanying drawings and also in the following description setting forth the construction illustrated thereby, similar reference characters denote similar parts throughout.

Referring to the drawings, the mold apparatus of this invention may be said to consist of three main elements, the lower mold member or section 1, the upper mold section 2, and the core unit 3. The last named unit consists of the tire core 4 and the sectional bull ring 5, these parts being usually assembled and with the carcass thereon applied as a unit to the mold. The position and cooperation of the several parts is best shown in Figure 3 of the drawings wherein it will be noted the centers of the mold members abut, a special feature of my mold apparatus. The bull ring 5 fits snugly about these centers in the annular channel 6, due allowance being made in the fit of the ring to accommodate variation in expansion of the mold and said ring, since the mold is usually hot when the core unit is disposed therein in the molding operation.

Upon the solid center of the lower mold member and contiguous to the channel 6 I mount a plurality of locking members 7, substantially Z-shaped in configuration. These members are secured by pivot bolts 8, sufficient play being provided to permit the slight tilting of the members for reasons hereinafter referred to. The free end of these members 7 are turned to engage over the bull ring 5 when the latter has been placed in its proper position in the mold, and since it happens that the unit does not ordinarily fit down tightly in place, due to the interior projections 9 which form the design on the tread of the tire, a sufficient play of the locking members must be provided to permit them to be rotated into engagement with the ring, this being clearly shown in Figure 4 of the drawings. When the upper mold section is placed in position and pressure applied, the core unit of course is pressed home into the proper molding position.

It should be explained at this point that the material of the solid center of the upper mold member is formed with recesses or pockets 10 so as to accommodate the locking members 7 and in order to prevent accidental movement of these members in the handling of the apparatus during the molding operation, the side walls of the pockets are so arranged as to cooperate with the opposite sides of the locking members while the under surface of the top mold member seats upon the top of the free end of the locking members, as shown in Figure 4. This disposition of parts requires fairly accurate registration of the mold members themselves to insure the positioning of the members 7 in the pockets and to facilitate this I provide a registering pin 11 on one of the mold sections, preferably the lower, as shown in Figures 1 and 5, the opposite section having an apertured lug 12 thereon to receive the pin.

It will now be apparent that the molding apparatus is used in the following manner: first the carcass is applied to the sectional core 4 and the bull or clamping ring 5 is then attached to the core. This core unit is now dropped into the lower mold section with the tire resting in the outer molding chamber or channel 13. The locking members 7 are now turned to engage over the bull ring, as shown in Figure 4, then the upper mold section is applied, the pin 11 causing all of the parts to register properly. The mold is now placed in the heater and pressure applied by the ram, thereby forcing the parts together and the tire core unit into place, after which the tire is cured and vulcanized.

Upon the completion of the vulcanizing process the upper mold section is lifted and if the tire adheres to the top section, such adherence will be broken by the contacting of the ring 5 with the members 7 and the core unit is thus left in the lower half of the mold. The members 7 are now turned so as to free the ring, whereupon a pinch bar or similar implement is employed after the manner shown in Figure 6 to raise the core unit from the lower section. In order to enable the bar to easily engage beneath the ring, a recess or notch 14 is formed at the periphery of the raised solid center of the lower section of the mold. Furthermore, to permit of thus tilting the core unit out of its seat the periphery of this raised solid center is beveled off. This beveled formation is also quite important as it eliminates the necessity of maintaining the core unit exactly horizontal when disposing it in the mold, as would be required otherwise because of the close fit of the ring.

The function of this raised solid center in assembling must be apparent, of course, to those skilled in the art, in that it is evident the core unit will be centralized as it slides down the beveled periphery into the annular channel 6 and the outer periphery of the ring is tightly forced against the outer wall of the channel 6 by the wedging action which takes place.

At this point it is well to note that I prefer to construct the lower section 5ᵃ of the bull ring with the inner vertical flange 5ᵇ as this construction insures against possibility of the prying implement being accidentally engaged between the ring sections which would be likely to strain or strip the clamping bolts 5ᶜ for clamping the ring sections together.

In Figures 1 and 7 it will also be noticed that the rotation of the locking members 7 is limited by the provision of stop pins 7' arranged directly adjacent to the respective locking members.

I desire it to be understood that changes may readily be made in the details of construction and arrangement of the parts without departing from the spirit of the invention and within the scope of the claims appended hereto.

Having thus described my invention, what I claim as new and desire to secure by Letters Patent is:—

1. Tire molding apparatus of the class described comprising complemental mold members, a core unit including a bull ring, and loosely swinging means on one of said mold members engageable with the ring and adapted to break adherence of the core unit in the separation of the mold members.

2. Tire molding apparatus of the class described comprising complemental mold members, a core unit including a bull ring, means on one of said mold members engageable with the ring and adapted to break adherence of the core unit in the separation of the mold members, and means on the other mold member adapted to coact with said last mentioned means to prevent accidental displacement thereof with relation to the ring.

3. Tire molding apparatus of the class described comprising complemental mold members having a peripheral tire molding chamber, said members being formed with abutting centers, a core unit adapted to be disposed between the members and about the centers and including a clamping ring, and lugs having a certain degree of play and mounted upon the center of one mold member and engageable with the ring for retaining the core unit in said mold member in the separation of the mold members after molding operation.

4. Tire molding apparatus of the class described comprising complemental mold members having solid centers projecting inwardly into abutting relation, a core unit disposable between said mold members, a plurality of locking members mounted upon the center of one of the mold members, the solid center of the other mold member being provided with pockets or recesses to accommodate the locking members aforesaid, and cooperating means on the mold members for insuring registration of the pockets with respect to the locking members.

In testimony whereof I affix my signature.

LAURITS A. LAURSEN.